(No Model.) 2 Sheets—Sheet 1.
F. B. HARVEY & B. F. HARTMAN.
COMBINED ROLLER AND HARROW.
No. 476,142. Patented May 31, 1892.
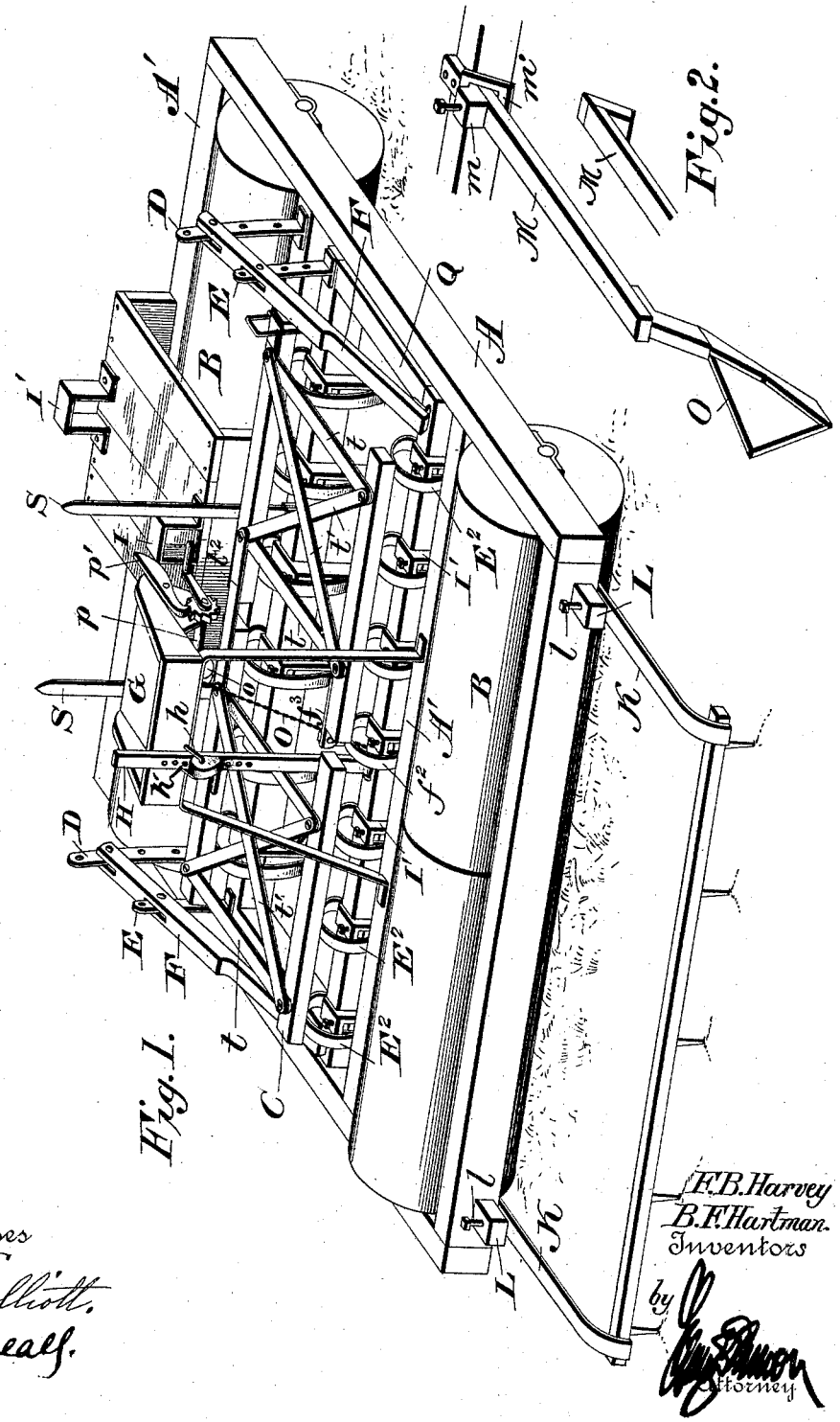
Witnesses
L. S. Elliott.
H. S. Beall.
F. B. Harvey
B. F. Hartman.
Inventors

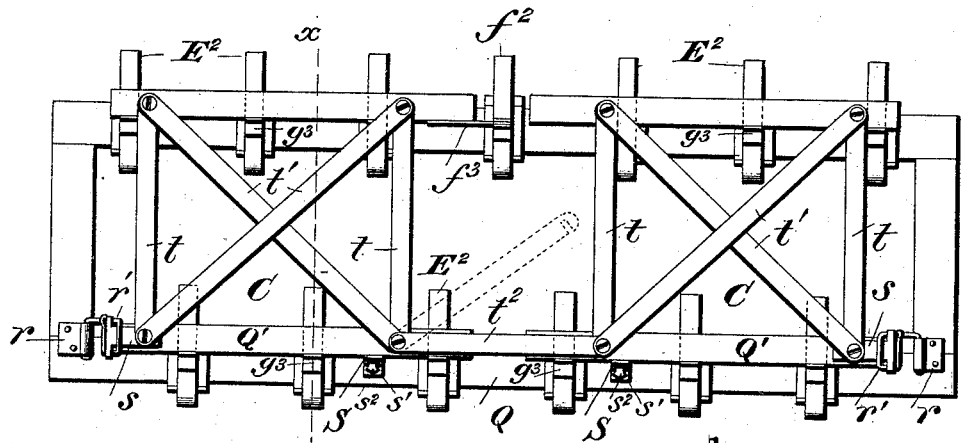
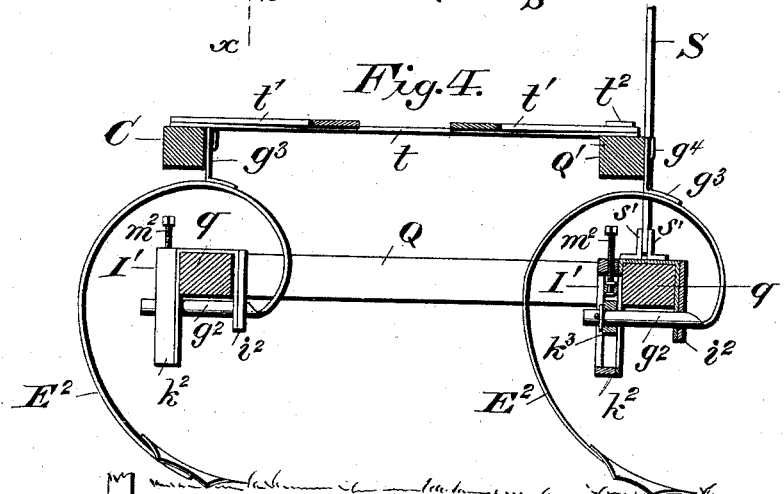
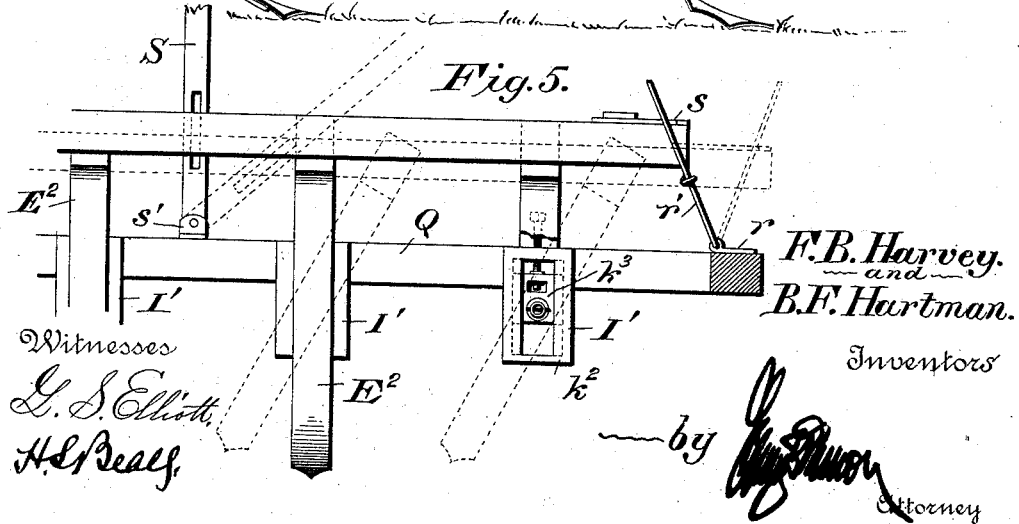

UNITED STATES PATENT OFFICE.

FRANCIS B. HARVEY AND BENJAMIN F. HARTMAN, OF PICKERING, PENNSYLVANIA.

COMBINED ROLLER AND HARROW.

SPECIFICATION forming part of Letters Patent No. 476,142, dated May 31, 1892.

Application filed May 7, 1891. Serial No. 391,887. (No model.)

*To all whom it may concern:*

Be it known that we, FRANCIS B. HARVEY and BENJAMIN F. HARTMAN, citizens of the United States of America, residing at Pickering, in the county of Chester and State of Pennsylvania, have invented certain new and useful Improvements in a Combined Roller and Harrow; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in rollers and harrows; and it consists in the construction and combination of the parts, as will be hereinafter fully set forth, and particularly pointed out in the claims.

In the accompanying drawings, forming a part of this specification, Figure 1 is a perspective view of a combined roller and harrow constructed in accordance with our invention. Fig. 2 is a detail perspective view of a furrow marker or maker which is adapted to be used in connection with the frame. Fig. 3 is a plan view of the harrow, showing the same removed from the frame; and Fig. 4 is a sectional view of Fig. 3, taken through the line $x\ x$. Fig. 5 is a detail view of a rear elevation.

A refers to a rigid rectangular frame having cross-bars A' rigidly secured thereto, said cross-bars forming front and rear transverse spaces, within which are journaled rollers B B of suitable construction. Between the central cross-bars A' a space is provided which is occupied by a harrow-frame C, said harrow-frame being connected to one of the cross-bars in a manner to permit the same to be raised and lowered. The construction of the harrow-frame will be hereinafter set forth.

The front cross-bar A' has secured thereto, near each end, an upright D, having a series of perforations, and adjacent thereto the front bar of the harrow-frame C carries curved uprights E E, with perforations spaced nearer together than the perforations in the uprights D. Connected to these uprights are levers F F, the rear ends of which are hinged to the rear cross-bar of the harrow-frame, said levers swinging on the uprights D D in raising and lowering the harrow-section. This manner of connecting the harrow-frame with the roller-frame permits said harrow-frame to be vertically adjusted, so that the teeth thereof can be caused to enter the ground at a desired depth, and in connection therewith we provide a means for elevating the harrow frame or section, so that the teeth carried thereby will be entirely free from the ground.

G designates the driver's seat, which is mounted on a suitable frame or tripod, the legs of which are secured to the central cross-bars A' of the roller-frame. To the rear cross-bar of the lower frame of the harrow-section is suitably connected or hinged a bar H, which extends upwardly therefrom and passes through a loop or bail $h$, attached to the back of the seat, adjacent to which is a pin $h'$, which engages with one of the perforations in the bar H, and when said pin is in engagement this bar will hold the harrow-frame in whatever position it may be secured. The loop or bail $h$ carries a cam which when turned up will hold the bar in engagement with the pin $h'$, carried by the seat. This cam is provided with a handle for operating the same. In the drawings the cam is shown turned down, so that by pushing the bar H rearwardly it can be disengaged from the pin.

O refers to a flexible chain or connection, which is secured to the harrow-section adjacent to the lower end of the bar H, while its upper end is secured to a grooved disk $o$, mounted on a shaft $p$, carried by suitable hangers which depend from the driver's seat, and this shaft has rigidly attached thereto a ratchet-wheel and crank-arm. A pawl $p'$, pivoted to one side of the driver's seat, engages with the ratchet-wheel, and when the shaft is turned to elevate the harrow-section the pawl and ratchet will act to hold the same elevated. Before operating the windlass beneath the driver's seat the bar H should be first thrown out of engagement with its securing-pin $h'$. The windlass and chain are used for elevating the harrow-section and holding it raised, while the bar H will hold the harrow rigid against vertical movement.

I and I' refer to the tongue-supporting loops or bails, to which the rear end of the tongue is secured in the usual manner, so that it may be permitted to have a slight up-and-down movement.

To the rear end of the roller-frame are detachably secured rearwardly-extending spring-arms K, which are connected to each other by a cross-bar having teeth which serve as markers, and these teeth may be caused to enter the ground to a greater or less extent by properly adjusting the bolts $l$, which pass through the projecting blocks L. This construction of marker is used for laying off ground for corn or vegetables; but in some cases we attach a furrow-opener, as shown in Fig. 2, which is secured to a block $m$, attached to the rear beam of the harrow-frame, and over this block is placed a loop $m'$, through which is passed the end of the bar M, said end being bent, as shown, to form a cheap, simple, and convenient connection. The rear end of the bar M carries a marker O, the front edge of which is inclined, while the sides diverge upwardly, as shown. The bars K and M are connected to the frame pivotally, the bent end of the bar M (shown in Fig. 2) having a pivotal movement in the loop, while in Fig. 1 an ordinary hinge connection is made between the end of the bar K and the frame. When the bolts $l$ are turned, their lower ends will impinge against the surface of the bars, and thus hold their free ends depressed, said bolts being screw-threaded to engage with the threaded apertures in the rearwardly-projecting portions attached to the rear bar of the main frame. A series of these markers may be secured to the rear beam, and by properly adjusting the bolt they can be caused to enter the ground at the proper depth, so as to not only lay off the ground, but make furrows into which can be dropped the seeds of such plants as may be desired to cultivate either in rows or hills.

The harrow C is preferably made up of a rectangular frame Q, provided with transverse bars $q$, which are provided adjacent to their front ends with eye-plates $r$, with which the bent ends of the looped bars $r'$ engage, said bars being bent upon themselves to form a loop which engages with T-plates $s$, attached to and carried by the outer ends of each of the upper frames Q'. Upon the front cross-bar of the frame Q are rigidly secured angle-plates $s'$ $s'$, between which are pivoted the lower ends of levers S. The central portion of these levers are slotted for engagement with the headed projecting pins or bolts $s^2$, attached to the front cross-bars of the upper sections C. The sections C are made up of front and rear bars, which are suitably braced to each other by bars $tt$ and $t'$ $t'$, and these sections are further connected to each other when desired by a pivoted bar $t^2$, attached to one of the sections and slotted for engagement with a bolt on the opposite section. The rear beam of the frame Q carries a central tooth $f^2$, which may be similar in construction to the other teeth, and it is connected to one of the frames by a bar or rod $f^3$, so as to rock or move in unison with the other teeth when they are adjusted by the levers hereinbefore referred to. The spring-bars $E^2$, which carry the cultivator or harrow teeth, have their ends turned or formed into tubes or cylinder $g^2$, or they can be formed to be semicircular in cross-section and welded or suitably connected to a round piece of metal, so that the said ends can turn in hangers or bearings. These spring-teeth $E^2$, adjacent to their upper portions, have angle-plates $g^3$ rigidly connected thereto, and the upwardly-projecting members of these angle-plates are slotted for engagement with bolts $g^4$, said bolts being secured to the transverse bars of the upper frames or sections. By this means all the teeth are secured to the bars Q' of the section C, and it is obvious that these teeth should be adjusted so as to bring all the points on the same line. The springs $E^2$ extend rearwardly and downwardly, and adjacent to their lower ends are secured cultivator or harrow teeth of any preferred construction. To the transverse bars of the lower section of the harrow-frame are secured castings or hangers I', having front depending members $i^2$ and rear depending members $k^2$, which carry a vertically-adjustable slide $k^3$, which can be positioned by screw-bolts $m^2$, which pass through a threaded aperture in the upper part of the casting or fixture I', the lower end engaging with the slide. By this or analogous construction when the bolt is turned the angle of the rounded shank of the spring-tooth can be varied and the relative position of the same changed. By making the proper adjustments the teeth can be caused to enter the soil at the proper depth, and when it is desired to change the angle of the tooth with respect to the frame it can be done by shifting the levers or throwing them to one side so as to incline the teeth, as shown in Fig. 5.

If desired, the lower frame of the harrow may be provided with suitable fenders between which the teeth will be located, and these fenders can be attached to said frame by springs.

If it should be desired to rock only one of the frames the connecting-bar between the upper sections of the harrow can be swung to throw it out of engagement with the adjacent section, and in such a case the teeth connected to each upper section will be independently adjustable.

Having thus described our invention, what we claim as new, and desire to secure by Letters Patent, is—

1. In a combined harrow and roller, a frame constructed substantially as shown and provided in rear of the rear roller with markers which can be set to enter the ground to a greater or less extent, as desired, by means of bolts which pass through blocks secured to the roller-frame, said bolts being adapted to bear upon the bars carrying the markers, substantially as set forth.

2. In combination with a harrow pivotally attached to a supporting-frame, said frame having an elevated seat and bar H, having a vertical series of perforations, a pin carried by the driver's seat, with which the bar H is adapted to engage, and a bail or loop carrying a cam which is adapted to engage with the bar H to hold it in engagement with the pin, substantially as set forth.

3. In combination with a frame, a harrow-section C, made up of upper and lower frames secured to each other so as to have a rocking movement, springs having horizontally-projecting ends secured in bearings, and angle-plates for connecting the lower sections pivotally to the springs and frames and means for laterally moving the upper sections with respect to the lower sections, substantially as set set forth.

4. The combination, in a spring-tooth harrow, of a frame having fixtures or bearings in which the upper terminal portions of the teeth are secured, so as turn or have a rotary movement in said bearings, the bearings which engage with the terminal portions of the spring-teeth being vertically adjustable, whereby the angle of the teeth can be varied with respect to the frame and also adjusted in relation to the depth which the points will enter the ground, substantially as shown, and for the purpose set forth.

5. The combination, in a harrow for the purpose set forth and constructed substantially as shown, of spring-teeth journaled in the lower section of the harrow, upper sections connected to the spring-teeth, a swinging bar for connecting the upper sections to each other, and a central spring-tooth connected to one of the sections by a spring-bar, substantially as set forth.

In testimony whereof we affix our signatures in presence of two witnesses.

FRANCIS B. HARVEY.
BENJAMIN F. HARTMAN.

Witnesses:
JENNIE R. HARTMAN,
CLARA B. HOWARD.